(No Model.) 2 Sheets—Sheet 1.
J. W. FLAGG.
AUTOMATIC CASH CARRIER.
No. 319,692. Patented June 9, 1885.
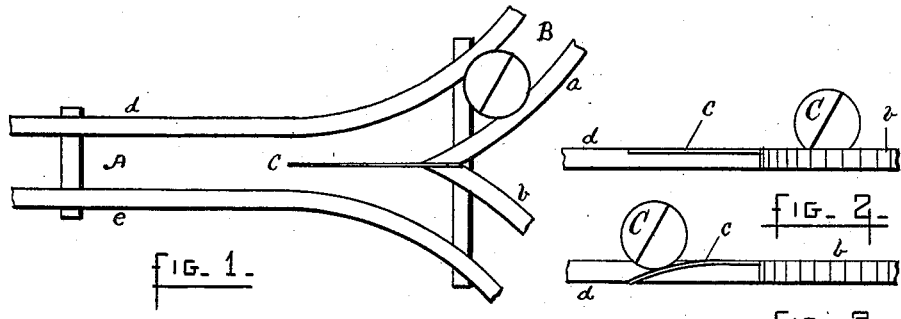
Fig. 1.
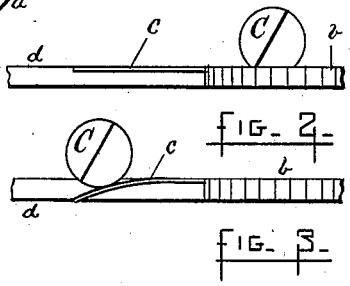
Fig. 2.
Fig. 3.
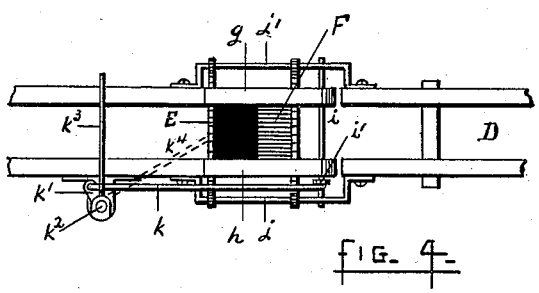
Fig. 4.
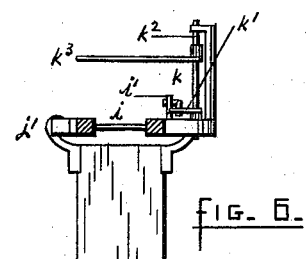
Fig. 6.
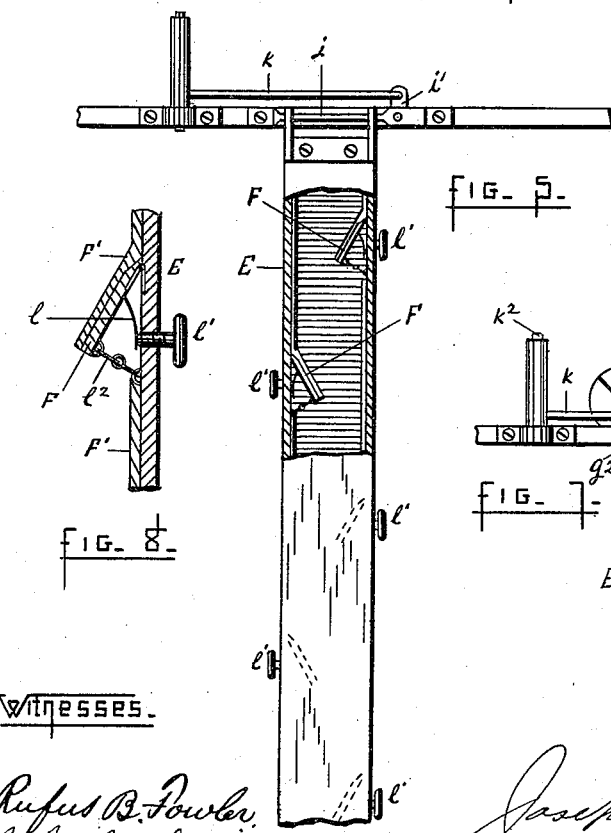
Fig. 5.
Fig. 8.
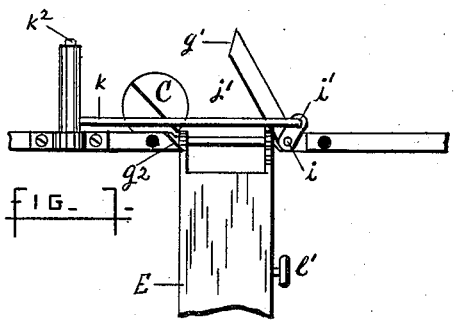
Fig. 7.
Witnesses
Rufus B. Fowler
B. M. McCrohan
Inventor
Joseph Walter Flagg (No Model.) 2 Sheets—Sheet 2.

J. W. FLAGG.
AUTOMATIC CASH CARRIER.

No. 319,692. Patented June 9, 1885.

Witnesses
Rufus B. Fowler
B. M. McCrohan

Inventor
Joseph Walter Flagg

UNITED STATES PATENT OFFICE.

JOSEPH WALTER FLAGG, OF WORCESTER, MASSACHUSETTS.

AUTOMATIC CASH-CARRIER.

SPECIFICATION forming part of Letters Patent No. 319,692, dated June 9, 1885.

Application filed March 7, 1885. (No model.)

*To all whom it may concern:*

Be it known that I, JOSEPH WALTER FLAGG, a citizen of the United States, residing at Worcester, in the county of Worcester and State of Massachusetts, have invented certain new and useful Improvements in Automatic Cash-Carriers, of which the following is a specification containing a full, clear, and exact description of the same, reference being had to the accompanying drawings, representing such portions of a cash-carrying system as embody my improvements.

My invention relates to that class of automatic cash-carriers in which rolling cash-carriers are employed to conduct the cash upon inclined ways from the several salesmen in a store to the cashier's desk, and vice versa; and my invention consists of an elastic frog placed at the intersection of converging branchways with the inward inclined way; in the methods of delivering the carriers from the outward track to their appropriate stations, and in devices for conveying the carriers from the outward track to the salesmen on the same or the lower floors of the building.

The arrangement of the inclined ways are too well known to require detailed illustration, and I have therefore shown only such parts as embody the several features of my invention.

Figure 9:
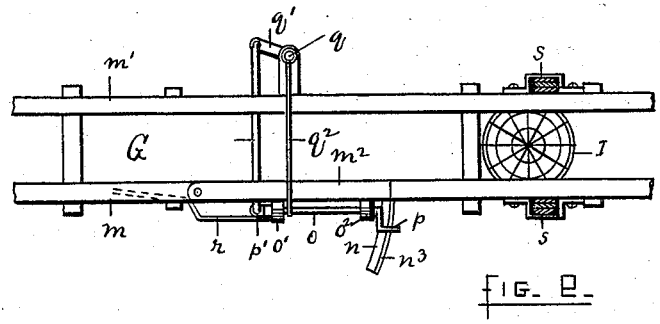
Figure 10:
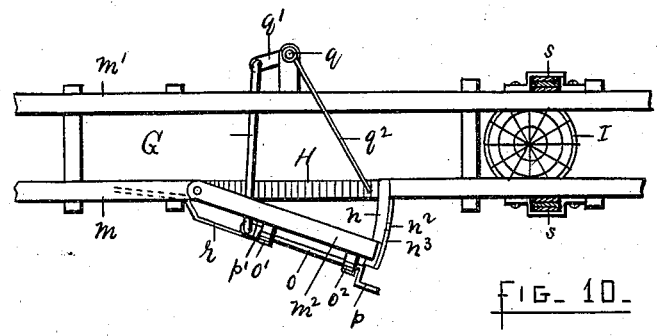
Figure 11:
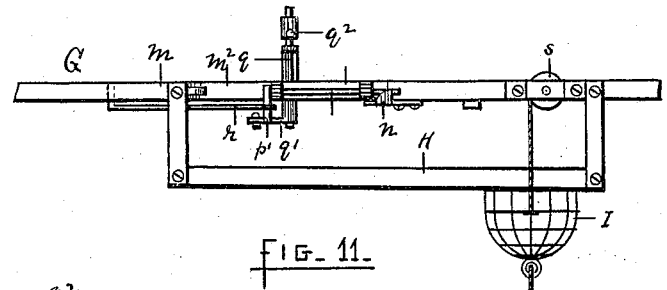
Figure 12:
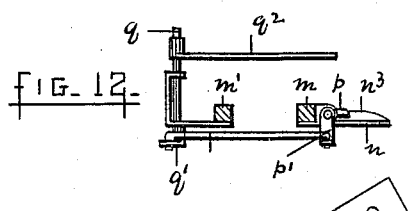
Figure 14:
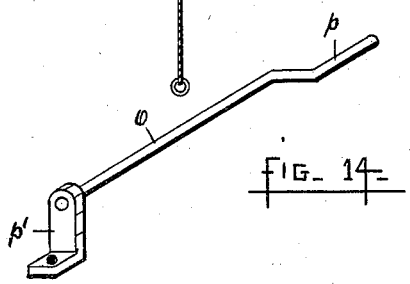
Figure 13:
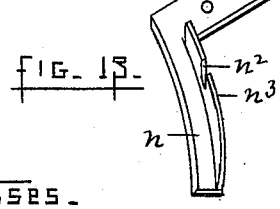

Figure 1 is a top view of a portion of the inward way and a converging branchway upon which the rolling carriers are carried to the cashier's desk. Fig. 2 is a side view of the same with the nearest rail, $f$, removed. Fig. 3 shows the same view with one of the carriers upon the elastic frog. Fig. 4 is top view of a portion of the outward way upon which the rolling carriers are conducted from the cashier's desk, showing the device for delivering the carriers from the outward track. Figs. 5 and 6 are respectively side and end views of the same. Fig. 7 is a side view of the same with a section of the track raised to allow the passage of one of the carriers. Fig. 8 is a detached view of one of the hinged plates in the delivery-tube. Fig. 9 is a top view of a portion of the outward track, showing the devices employed to deliver the carrier from the outward track by means of a laterally-sliding rail. Fig. 10 represents the same with the track open to allow the passage of a carrier. Figs. 11 and 12 are side and end views of the part shown in Fig. 9. Fig. 13 shows the curved bar upon which the end of the pivoted section of rail slides, and Fig. 14 is a view of the latch.

Similar letters refer to similar parts in the several views.

A is a portion of an inward inclined track having a converging branch track, B. At the intersection of the rails $a$ and $b$, I attach an elastic wire or rod, $c$, extending between the rails of the main track A until its normal width is assumed. As the carrier C passes from the branch track, it is supported by the rail $d$ and elastic rod $c$, which, gradually yielding to the weight of the carrier, as shown in Fig. 3, is pressed down low enough, when the normal width of the track is reached, to allow the carrier to rest equally on the rails $d$ and $e$. The rod or wire $c$, I prefer to make elastic throughout its whole length; but it may be formed of a rigid rod or bar with a short elastic section near the point of its attachment to the rails $a$ and $b$.

In Fig. 4, D represents a portion of an outward inclined track, along which the carriers roll from the cashier's desk to the stations of the several salesmen. At the different localities where a carrier is to be delivered from the outward track a short section of each of the rails is pivoted or hinged at one end so its free end may be raised, forming an opening or break in the track. In the present construction the sections $g$ and $h$ are shown attached at one end to the rotating spindle $i$, which turns in bearings in the side rails or bars, $j\ j'$. To the spindle $i$, I attach an arm, $i'$, extending upward and connected by a link, $k$, to the short horizontal arm $k'$ on the rotating post $k^2$, held in a supporting-frame attached to one of the rails forming the track. From the vertical rotating post $k^2$ a horizontal arm, $k^3$, extends across the track. This arm $k^3$ is vertically adjustable on the post $k^2$, so it may be placed in proper position to be struck by carriers of a certain size, which are intended to be delivered from the outward track by the raising of the pivoted sections $g\ h$ of the rails. In the normal position of the device the rails $g$ and $h$ have their beveled free ends $g'$ resting against similar beveled ends, $g^2$, of the main track, the pivoted sections $g$ and $h$ forming with the rigid rails one continuous way, the horizontal arm $k^3$ extending across the track and adjusted vertically on the post $k^2$ so as to receive the impact of all carriers intended to be delivered at this station. The passage of such a carrier will carry the arm $k^3$ into the position shown in Fig. 7, and also by broken lines $k^4$ in Fig. 4, rotating the post $k^2$, and through the arm $k'$, link $k$, and arm $i'$, rotating the spindle $i$, and thereby raising the attached rails $g$ and $h$, as shown in Fig. 7, allowing the carrier to fall through the opening so formed in the track, the rails $g$ and $h$ then returning by their own weight to a horizontal position, and reversing the motion of the horizontal arm $k^3$ to its former position at right angles with the track. If necessary, the spindle $i$ may have a counter-weight attached to balance in part the weight of the rails $g$ and $h$.

Beneath the opening formed in the track for the delivery of the carrier I place a tube, E, extending downward to a receptacle to receive the carrier placed on the counter; or in some cases the tube E may be carried down through the floor and the carriers delivered to salesmen on the lower floors of the building. In the interior and upon two opposite sides of the tube I hinge the plates F, hanging downward and obliquely to the sides of the tube, with a spring, $l$, attached to their under sides and pressing against adjusting-screws $l'$, held in the sides of the tube. The links $l^2$, connecting the edges of the plates F with the sides of the tube, serve to limit their motion toward the center of the tube. As the carrier falls through the tube, its downward motion is impeded as it comes in contact with the hinged plates F by the tension of the springs $l$, which are adjusted by the screws $l'$ to barely allow the carrier to compress them and pass the hinged plate. The inner sides of the tube I line with felt, F', in order to deaden the noise of the passing carriers.

The above-described method of delivering the carriers from the outward way is specially adapted to stores having very high ceilings, or in which the carriers are to be conducted from the outward way through the floor to the lower stories of the buildings. In stores in which the altitude of the outward way is not too great to prevent a vertically-moving delivery-basket from being used, I employ the delivery devices illustrated in Figs. 9, 10, 11, and 12; and in stores having high ceilings and in which the outward track is very long, both methods of delivering the carriers may be employed to advantage, the former at the beginning of the outward way, and the latter when by reason of the inclination of the way its altitude has been decreased.

Referring to Fig. 9, G indicates a portion of the outward way formed of the rails $m$ and $m'$. The rail $m$ has a short section, $m^2$, pivoted at one end to the rail $m$, its opposite or free end having a lateral motion, sliding on the curved bar $n$ to the position shown in Fig. 10. Upon the side of the pivoted section $m^2$, I place a rocking shaft or spindle, $o$, turning in bearings $o'$ $o^2$, attached to the rail, and having a crank, $p$, formed on one end, adapted to engage the notch $n^2$ on the upper side of the curved bar $n$, and at its opposite end a vertical arm, $p'$. At the side of the track, and preferably at some distance from it, I place the upright rotating post $q$, turning in suitable bearings attached to the track, and carrying a short horizontal arm, $q'$, extending nearly parallel to the rail $m^2$, and connected with the vertical arm $p'$ on the rock-shaft $o$, and a horizontal arm, $q^2$, extending across the track and at right angles thereto, and adjustable vertically on the post $q$, so as to receive the impact of those carriers intended to be delivered at this station, and allow all smaller carriers to pass beneath it. A blade-spring, $r$, attached to the frame-work supporting the track, or to the rigid portion of the track, and acting against the vertical arm $p'$, tends to rock the spindle $o$ on its bearings and press the cranked end $p$ against the edge $n^3$ on the upper side of the bar $n$, thereby checking the further rotation of the spindle $o$, when the tension of the spring will be expended in carrying the free end of the rail $m^2$ into line with the rail $m$, and bringing the crank $p$ coincident with the notch $n'$, into which it enters, securely locking the rail $m^2$ in the position shown in Fig. 9, forming a continuous line of track. Upon the passage of a carrier of sufficient size to actuate the horizontal arm $q^2$, the post $q$ will be rotated, rocking the spindle $o$ by means of the connected arms $q'$ and $p'$, until the crank $p$ is raised from out the notch $n^2$, when the further rotation of the post $q$ acts to carry the free end of the rail $m^2$ outward, increasing the width between the rails sufficiently to allow the carrier to fall onto one end of the rails H, suspended below the main track and inclined to cause the carrier to roll forward and fall through an opening into a delivery-basket, I, suspended by cords to the winding-drums $s$ $s$, by which it is returned to and held against the under side of the rails H. When the carrier has passed through the main outward track, the tension of the blade-spring $r$ will return the rail $m^2$ back to its normal position, the continuous pressure of the crank $p$ against the edge $n^3$ insuring its entrance into the notch $n^2$. The spring $r$ should be applied to the vertical arm $p'$ at a short distance from the center of the rocking spindle $o$, so as not to give an undue pressure to the crank $p$ upon the edge $n^3$. The spindle $o$ should be so placed with relation to the notch $n^2$ that when the crank $p$ has entered the notch the centers of the spindle $o$ and crank $p$ will be in the same horizontal plane. The axis of the rotating post $q$ should be placed in advance of the axis of the rail $m^2$, so the carrier will enter on the pivoted rail $m^2$ before it strikes the arm $q^2$, and I place the post $q$ at some distance from the track in order to increase the radial distance at which the horizontal arm $q^2$ will receive the impact of the carrier.

With this improved method of delivering the carriers from the outward track I am able to use graduated carriers with but slight difference in size, usually not exceeding one-sixteenth of an inch, which is a great advantage when a large number of carriers are used, a very slight movement of the arm $q^2$ and post $q$ serving to unlatch the pivoted section of the rail, at which time the carrier has already entered upon the rail $m^2$, so that as soon as the carrier has been lowered so as to clear the arm $q^2$ it will be far enough advanced on the rail $m^2$ to open it and effect its passage.

It will be readily seen that instead of raising a section of both rails, as shown in Fig. 4, one only could be actuated by the carrier, forming an opening sufficient to allow its passage, and instead of sliding a section of one of the rails, as shown in Fig. 9, a section in each rail might easily be so connected that they would open, moved by substantially the same mechanism as I now employ, and consequently come within the scope of my present invention.

I am aware that a horizontal vibrating arm attached to a vertical rotating post has been heretofore used, actuated by the passage of rolling carriers along the track. Such a device used for the purpose of operating a switch has been shown and described in a former patent of the United States granted to me.

I am also aware that sections of rails have been hinged so as to rise vertically and form an opening in the track to allow the carriers to fall through. These features I do not now claim, independently and broadly.

With reference, however, to the device for effecting the delivery of the carriers from the outward track, (shown in Figs. 9, 10, 11, and 12,) I do not confine myself to the specific construction therein shown, whereby the pivoted rail is unlatched and moved laterally, in the first instance, by the action of the horizontal arm and rotating vertical post, and subsequently by the direct action of the carrier itself, the essential feature of this part of my invention consisting in the use of a laterally-moving section of rail, opening outward, so as to utilize the weight of the carrier in opening the same.

What I claim as my present invention, and desire to secure by Letters Patent, is—

1. The combination, with the inward way of a cash-carrying apparatus, said way having a converging branch track, of an elastic frog attached to the intersecting rails, extending, in its normal position, midway between the rails of the main track and in the same plane, said elastic frog being capable of vertical deflection downward by the weight of the carrier, whereby the carrier is conducted from the branch track onto the main track, as and for the purpose set forth.

2. The combination, with the outward way of a cash-carrying system and graduated carriers adapted to roll thereon, of a horizontal arm extending over said way in suitable position to receive the impact of certain of the carriers, said arm being attached to a vertical rotating post, a vertical rotating post journaled in bearings at the side of the track, and a section of one or both of the rails forming the way pivoted so they may rotate in a vertical plane and produce an opening in the outward way to allow the carriers to fall, said pivoted rails and rotating post being so connected that the vibration of the horizontal arm extending over the way will simultaneously operate the pivoted rail, as and for the purpose set forth.

3. The combination of the arm $k^3$, post $k^2$, arm $k'$, rod $k$, and a pivoted section of one of the rails of an outward way of a cash-carrying system, said pivoted section being capable of vertical rotation, as and for the purpose set forth.

4. The combination, with a pivoted section, $h$, of one of the rails of the outward way of a cash-carrying system, said rail being attached to the rocking spindle $i$, of the spindle $i$, arm $i'$, attached thereto, and rod $k$, connecting said arm $i'$ with operating mechanism adapted to be actuated by the carriers, substantially as described, and for the purpose set forth.

5. The combination, with the outward way of a cash-carrying system, of the side bars, $j\,j'$, spindle $i$, sections of rails $g$ and $h$, attached to said spindle, and arm $i'$, connected with operating mechanism adapted to be actuated by the carriers, as and for the purpose set forth.

6. The combination, with the outward track of a cash-carrying system, of a delivery-tube through which the carriers are conducted from the outward way downward, said tube having a series of yielding obstructions to the passage of the carrier by which the momentum of the carrier is successively checked, as and for the purpose set forth.

7. The combination, with a delivery-tube leading downward from the outward track of a cash-carrying system, of the plates F, hinged to the interior sides of the tube, and held obliquely to said sides by springs whose tension offers resistance to the passage of the carriers, as and for the purpose set forth.

8. The combination, with a delivery-tube leading downward from the outward way of a cash-carrying system, of the hinged plates F, adjusting-screws $l'$, and springs, substantially as described, between said hinged plates and adjusting-screws, whereby resistance offered by the hinged plates may be varied, as and for the purpose set forth.

9. The combination of tube E, cushioned sides F', hinged plates F, spring $l$, adjusting-screws $l'$, and links $l^2$, all arranged substantially as described, and for the purpose set forth.

10. The combination, with the way of a cash-carrying system, substantially as described, adapted to conduct rolling cash-carriers from the cashier's desk to the several salesmen in a store, of a section of one of the rails pivoted at one end so the free end may move laterally outward and allow the carriers to fall through, said pivoted section having connected therewith a latching device for holding it in alignment with the rail, and mechanism adapted to be actuated by the carrier, by which it is unlatched, as described, and for the purpose set forth.

11. The combination, with the outward way of a cash-carrying system, one of whose rails has a section pivoted so as to move laterally outward, of a vertical rotating post journaled at the side of the way, and a horizontal arm attached to said post and extending over the way so as to receive the impact of carriers of a certain size, said post and the pivoted section of rail being so connected that the vibration of the horizontal arm will simultaneously move the pivoted section of rail laterally outward, as and for the purpose set forth.

12. The combination, with the pivoted section $m^2$, of rail $m$, rocking shaft $o$, having a crank, $p$, engaging a notch in the bar $n$, and an arm, $p'$, rotating shaft $q$, with arm $q^2$, connected with arm $p'$ on the rocking shaft $o$, and an arm, $q^2$, extending horizontally over the way, so as to be actuated by carriers of a certain size, as and for the purpose set forth.

13. The combination, with the way of a cash-carrying system and rolling carriers adapted to roll thereon, substantially as described, said way having a section of one of the rails pivoted so its free end may move laterally outward, said pivoted section having connected therewith actuating mechanism operated by the rolling carriers, whereby it is moved outward, of a spring applied to said pivoted section, by which the action of the rail and its connected operating mechanism is reversed, substantially as described, and for the purpose set forth.

14. The combination, with the outward way of a cash-carrying system, substantially as described, and having a section of one of the rails pivoted so its free end may move laterally outward, said pivoted section having a latching device by which it is held in alignment with the corresponding rail of the way, of a spring applied to the latching devices to effect the automatic action in latching the rail in proper position to allow the passage of carriers, as described, and for the purpose set forth.

15. In a cash-carrying system having an outward inclined way or track on which rolling cash-carriers are conducted from the cashier's desk to the salesmen, the combination, with said way or track, of a delivery-station formed by pivoting a short section of one of the rails of said way so its free end may move laterally outward and form an opening in the track for the passage of the carriers, said pivoted rail having connected therewith actuating devices operated by the rolling carriers, as and for the purpose set forth.

16. The combination, with the outward way of a cash-carrying system having a pivoted section of rail moving laterally outward to effect the delivery of the carriers, of a vertical rotating post connected with and actuating the pivoted rail and carrying a horizontal arm extending across the way to receive the impact of the carriers when said vertical post is placed in advance of the axis of the pivoted rail, so the carrier will have entered on the pivoted rail before it strikes the horizontal arm, as and for the purpose set forth.

JOSEPH WALTER FLAGG.

Witnesses:
RUFUS B. FOWLER,
HENRY E. HILL.